United States Patent Office 3,803,151
Patented Apr. 9, 1974

3,803,151
SYNTHESIS FOR THE PREPARATION OF
3-HYDROXY-N-ALKYLISOMORPHINANS
Terry Thomas Conway, Montreal, Quebec, Canada, assignor to Bristol-Myers Company, New York, N.Y.
No Drawing. Filed Aug. 23, 1972, Ser. No. 283,030
Int. Cl. C07d 43/28
U.S. Cl. 260—285                                    9 Claims

ABSTRACT OF THE DISCLOSURE 3-hydroxy-N-alkylisomorphinans are compounds known to possess valuable properties as narcotic analgetics and/or antagonists. The commercial use of these compounds has not been practical due to the high cost of making these compounds. An improved new synthesis has been found which provides the compounds in commercial yields via a total synthesis.

BACKGROUND OF THE INVENTION (1) Field of the invention

This invention embodies a new process for the preparation of compounds useful as analgetics and/or narcotic antagonists from materials other than opium alkaloids.

(2) Description of the prior art (A) U.S. Pat. No. 3,285,922 reports morphinans and isomorphinans having the formula

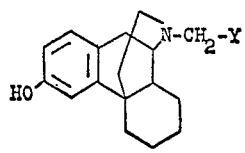

in which Y is cyclobutyl or cyclopropyl as possessing analgetic and/or narcotic antagonist activity.

(B) M. Gates and T. Montzka [J. Med. Chem., 7, 127 (1964)] report the synthesis of morphinans and isomorphinans of the formula

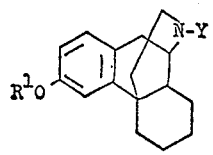

in which Y is cyclopropylmethyl, cyclobutylmethyl, 1-phenylcyclopropylmethyl, methyl, cyano, H, etc. and $R^1$ is methyl or H.

(C) M. Gates and W. Webb [J. Am. Chem. Soc., 80, 1186 (1958)], also reported similar compounds, the most pertinent of which appears to be that having the formula

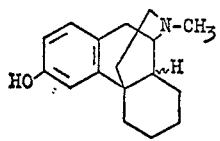

SUMMARY OF THE INVENTION

Isomorphian compounds having the formula

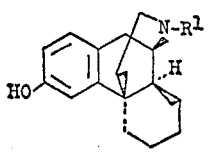

(XII)

wherein $R^1$ is (lower)alkyl, (lower)alkenyl, (lower)alkynyl,

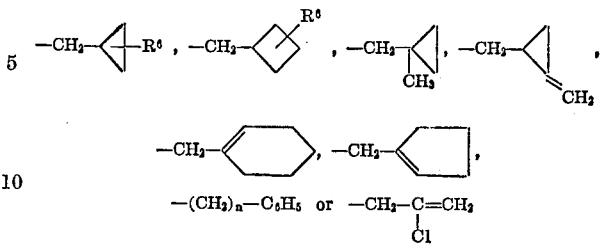

$-(CH_2)_n-C_6H_5$ or $-CH_2-C=CH_2$
                                    |
                                    Cl in which $R^6$ is H or $CH_3$ and $n$ is an integer of 1 to 3; or a pharmaceutically acceptable acid addition salt thereof are prepared by the consecutive steps of
  (A) Brominating the compound having the formula

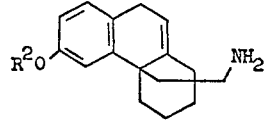

(V)

in which $R^2$ is (lower)alkyl with about an equimolar quantity of $Br_2$, to produce a compound having the formula

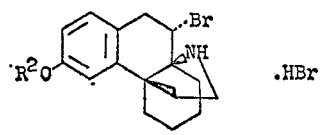

in which $R^2$ is as above;
  (B) Treating Compound VI with an organic or inorganic base to produce the compound having the formula

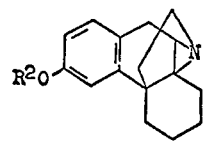

(VII)

in which $R^2$ is as above;
  (C) Treating Compound VII with a Lewis acid, a sulfonic acid or its equivalent, followed immediately by treatment with lithium aluminum hydride to produce the compound having the formula

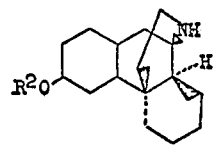

in which $R^2$ is as above.

The remaining consecutive steps of the synthesis will then vary according to the species of Compound XII desired.

When the ultimate compounds desired are those of the formula

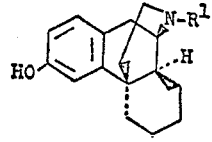

(XIIp)

wherein $R^1$ is $C_2-C_{10}$ (lower)alkyl,

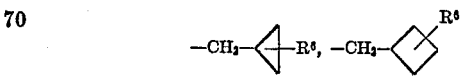

or

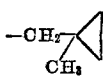

in which $R^6$ is H or $CH_3$ and $n$ is an integer of 1 to 3, one would further perform the steps of ($D^1$) Acylating Compound VIII with an acylating agent having the formula

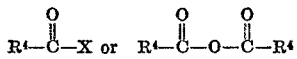

in which X is OH, Cl, Br of I, $R^4$ is (lower) alkyl, $—(CH_2)_n—C_6H_5$,

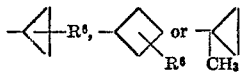

in which $R^6$ is H or $CH_3$, to produce the compound having the formula

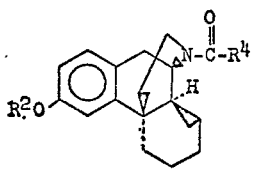

(Xp)

in which $R^4$ is as defined above;

($E^1$) Reducing Compound Xp wherein $R^2$ is (lower) alkyl and $R^4$ is $C_1$-$C_9$ (lower)alkyl,

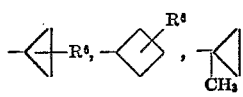

in which $R^6$ is H or $CH_3$ and $n$ is an integer of 1 to 3; and ($F^1$) Cleaving the ether function of Compound XIp to produce Compound XIIIp wherein $R^2$ is H.

However, when the ultimate species desired are those of the formula

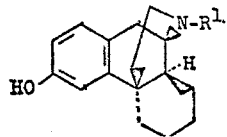

(XIIr)

wherein $R^1$ is $CH_3$, (lower)alkenyl, (lower)alkynyl, $—(CH_2)_n—C_6H_5$ or

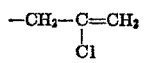

one would further perform the steps of ($D^2$) Alkylating Compound VIII with an alkylating agent having the formula $R^1$—X in which $R^1$ is methyl, (lower)alkynyl, (lower)alkenyl, benzyl, or

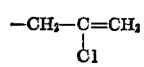

and X is chloro, bromo or iodo, or its functional equivalent as an alkylating agent for a secondary amine, to produce Compound XIr; and ($E^2$) Cleaving the ether function of Compound XIr to produce Compound XIIr.

Likewise, when the ultimate species of the compounds desired are those of the formula

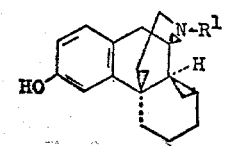

(XIIs)

wherein $R^1$ is

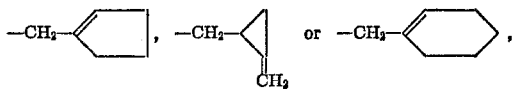

one would further perform the steps of ($D^3$) Acylating Compound VIII with an acylating agent having the formula

in which $R^5$ is a radical of the formula

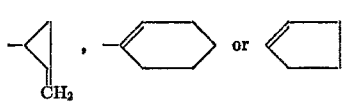

and X is chloro, bromo or iodo, or its functional equivalent as an acylating agent for a secondary amine, to produce compound Xs having the formula

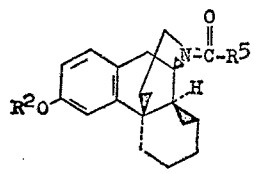

(Xs)

in which $R_2$ and $R_5$ are as above;

($E^3$) Reducing Compound Xs with lithium aluminum hydride to produce the compound having the formula

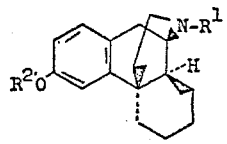

(XIs)

wherein $R^2$ is (lower)alkyl and $R^1$ is

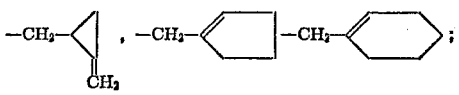

and ($H^3$) Cleaving the ether function of Compound XIs to produce Compound XIIs wherein $R^2$ is H.

Compounds having the formula

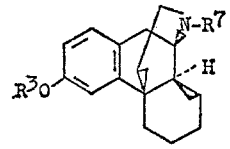

in which $R^3$ is H or methyl and $R^7$ is cyclopropylmethyl or cyclobutylmethyl are reported in U.S. Pat. No. 3,285,922 to possess valuable analgetic and/or narcotic antagonist activity.

Unfortunately these compounds are not available commercially due to their high cost of synthesis. These compounds, when prepared by the process of the Gates patent, are derived from opium alkaloids; expensive starting materials. In addition, the yields are low and thereby uneconomical.

Drug abuse by thrill-seeking youth or by people looking for an escape from the realities of every day life has become more and more commonplace in our present society. One class of widely abused drugs are the narcotic analgetics such as codeine, morphine, meperidine, etc. It is because of the high addictive potential of these agents that much time and money are being expended by the pharmaceutical industry and by governments to try and discover and develop new non-addicting analgetics and/or narcotic antagonists. The compounds of Formula XII appear to possess some of these desirable properties.

It was therefore an object of the present invention to discover a new and economical method of preparing these compounds.

It was a further object to develop a method employing starting materials that were not opium alkaloids or derivatives thereof.

The objectives of the present invention have been achieved by the provision of the process for the total synthesis of compounds having the formula

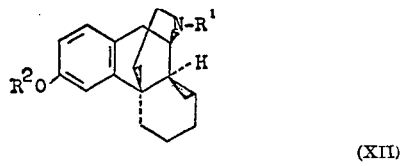

(XII)

in which $R^2$ is H or (lower)alkyl and $R^1$ is selected from the group comprising (lower)alkyl, (lower)alkynyl,

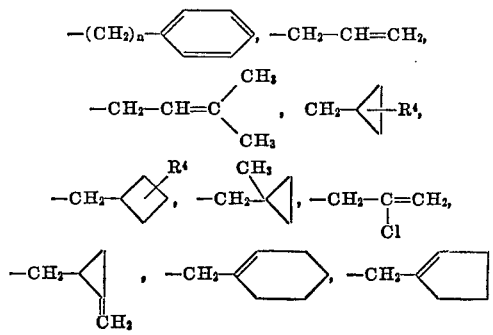

and $C_{3-7}$ alkenyl in which $R^4$ is H or $CH_3$ and $n$ is 1 to 3; from the readily available starting material 7-methoxy-3,4-dihyro-1[2H]-naphthalenone.

The compounds of the instant invention have the basic morphinan nucleus numbered and represented by the following plane formula

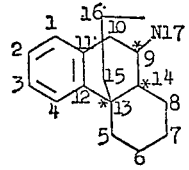

Although there are three asymmetric carbons (asterisks) in the morphinan molecule, only two diastereoisomeric (racemic) forms are possible, because the iminoethano system, attached to position 9 and 13, is geometrically constrained to a cis-(1,3-diaxial)-fusion. These reacemates can therefore differ only at the junction of rings B and C—in other words, in the configuration of carbon 14. The only variable will be the cis and trans relationship between the 5 (13) and 8 (14) bonds [Analgetics, Ed. George de Stevens, Academic Press, New York, p. 137 (1965)].

The compounds of the present invention have the 5 (13) and 8 (14) bonds trans to each other and are commonly designated as "isomorphinans." For the purpose of this application, the use of a graphic representation of an "isomorphinan" is meant to include the dl racemic mixture and the resolved d and l isomers thereof.

The "isomorphinan" compounds of the present invention can each exist as two optical isomers, the levorotatory and dextrorotatory isomers. The optical isomers can be graphically illustrated as:

ISOMORPHINANS

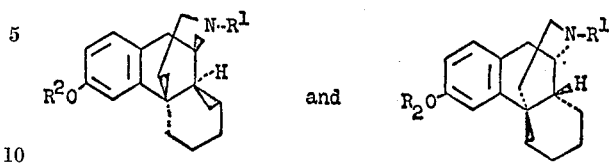

The present invention embodies all of the isomorphinan isomers including the optical isomers in their resolved form.

The optical isomers can be separated and isolated by fractional crystallization of the diastereoisomeric salts formed, for instance, with d- or l-tartaric acid or D-(+) α-bromocamphorsulfonic acid.

For the purpose of this disclosure, the term "(lower) alkyl" is defined as an alkyl radical containing 1 to 10 carbon atoms in straight or branched chains. The terms "(lower)alkynyl" and "(lower)alkenyl" are hydrocarbons of 2–10 carbons with 1 triple bond and 2–10 carbons with 1 double bond respectively. "(Lower)alkanol" is a straight or branched chain alcohol of 1 to 10 carbon atoms.

For the purpose of this disclosure, the term "acid addition salt" is defined to include all those inorganic and organic acid salts of the compounds of the instant invention, which salts are commonly used to produce nontoxic salts of medicinal agents containing amine functions. Illustrative examples would be those salts formed by mixing the compounds of Formula I with hydrochloric, sulfuric, nitric, phosphoric, phosphorous, hydrobromic, maleic, malic, ascorbic, citric or tartaric acid, and the like.

The compounds of the instant invention are prepared by a total synthesis comprising up to 10 steps. Surprisingly, the synthesis is efficient and appears commercially feasible. The process is outlined in Charts I, II and III.

CHART I

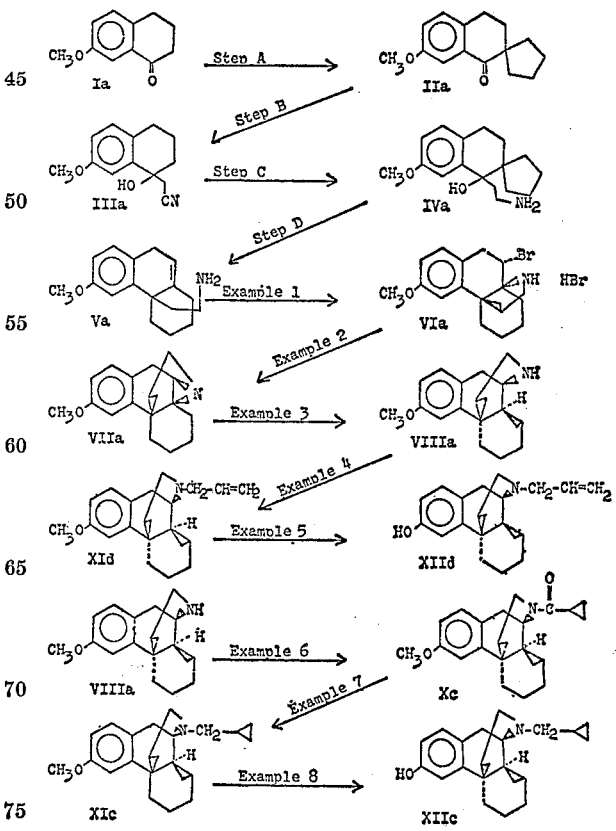

CHART II

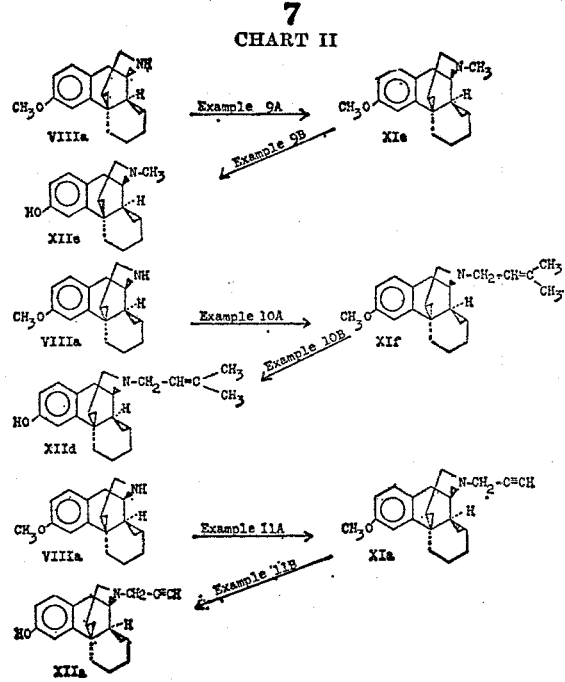

CHART III

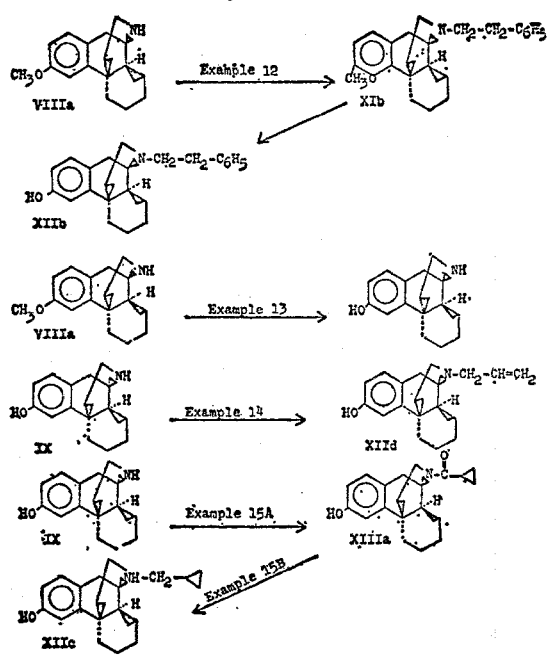

A preferred embodiment of the present invention is the process for the preparation of compounds having the formula (VIII)

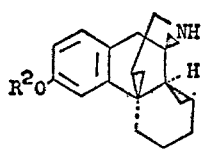

in which $R^2$ is (lower)alkyl, which process comprises the consecutive steps of (A) Brominating the compound having the formula

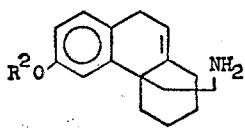

(V)

in which $R^2$ is (lower)alkyl with liquid bromine in chloroform, carbon tetrachloride, dichloroethane, benzene, toluene, xylene or methylene chloride in a ratio of at least 1 mole of bromine per mole of Compound V, at about —15° C. to +15° C., with stirring to produce the compound having the formula

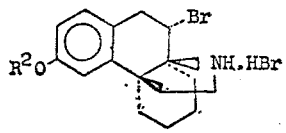

(VI)

in which $R^2$ is (lower)alkyl;

(B) Treating Compound VI with a base selected from the group comprising concentrated ammonium hydroxide, pyridine, triethylamine, sodium hydroxide, potassium hydroxide and the like in an organic solvent selected from the group comprising methylene chloride, chloroform, carbon tetrachloride, dichloroethane, benzene, toluene, xylene and the like, at a temperature in the range of about —10° C. to about +40° C. to produce the compound having the formula

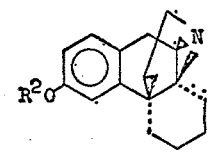

(VII)

in which $R^2$ is as above; and (C) Treating a solution of Compound VII in dry ether, tetrahydrofuran, dioxane and the like with at least an equimolar quantity of an anhydrous strong acid in a temperature range of about —10° C. to about +15° C.; then treating the mixture in situ with an excess of lithium aluminum hydride with the aid of heat for approximately five hours to produce the product having the Formula VIII.

Another preferred embodiment is the process for the preparation of compounds having the Formula VIII wherein in step (A) one mole of Compound V is added rapidly to about 1.0 to 1.3 moles of bromine, at a maximum molarity of 0.1 M bromine dissolved in chloroform, carbon tetrachloride, methylene chloride, dichloroethane, benzene, xylene or toluene, at a temperature of about —15° C. to +15° C.; in step (B) treating one mole of Compound VI with an excess of a base selected from the group comprising concentrated ammonium hydroxide, pyridine, triethylamine, sodium or potassium hydroxide and the like, in an organic solvent selected from the group comprising chloroform, carbon tetrachloride, dichloroethane and methylene chloride, in a temperature range of 0° C. to 40° C., with vigorous stirring for at least ten minutes; and in step (C) treating a solution of Compound VII in dry ether, tetrahydrofuran or dioxane with a strong acid selected from the group comprising p-toluenesulfonic acid, benzenesulfonic acid or boron trifluoride etherate, in a ratio of about one mole of acid per mole of Compound VII, at a temperature in the range of about —20° C. to about +25° C., with rapid stirring; then treating the mixture in situ with at least a four fold molar excess of lithium aluminum hydride at about reflux temperatures for at least five hours to produce the compound having Formula VIII.

A more preferred embodiment is the process for the preparation of compounds having the Formula VIII wherein in step (A) one mole of Compound V is added rapidly to an equimolar amount of bromine, at a maximum molarity of 0.1 M bromine dissolved in chloroform, methylene chloride, carbon tetrachloride or dichloroethane, at a temperature of about —15° C. to about 0° C. with rapid stirring; in step (B) treating one mole of Compound VI with at least two moles of a base selected from the group comprising concentrated ammonium hydroxide and 5–30% sodium or potassium hydroxide, in an organic solvent selected from the group comprising chloroform, methylene chloride and dichloroethane, at about room temperature, with vigorous stirring for at least ten minutes; and in step (C) treating a solution of Compound VII in dry ether, tetrahydrofuran or dioxane with p-toluenesulfonic acid in a ratio of about 1.0 to 1.2 moles of acid per mole of Compound VII, at a temperature of about 0° C. with rapid stirring for at least 15 minutes; then treating the mixture in situ with about a six fold molar excess of lithium aluminum hydride at about reflux temperature for at least five hours to produce the compound having Formula VIII.

A most preferred embodiment is the process of preparing the compound having the Formula VIII in which $R^2$ is methyl wherein in step (A) one mole of Compound V is added rapidly to ten liters of 0.1 M bromine in chloroform at a temperature of —15° C. to 0° C. with rapid stirring; in step (B) treating one mole of Compound VI with at least two moles of concentrated ammonium hydroxide in methylene chloride, at about room temperature, with vigorous stirring for at least ten minutes; and in step (C) treating a solution of Compound VII in dry tetrahydrofuran with p-toluenesulfonic acid in a ratio of 1.0 to 1.2 moles of acid per mole of Compound VII, at a temperature of about 0° C. with rapid stirring for at least 15 minutes; then treating the mixture in situ with about a six fold molar excess of lithium aluminum hydride at about reflux temperature for at least five hours 30 to produce the compound having Formula VIII in which $R^2$ is methyl.

Another preferred embodiment of the present invention is the process for the preparation of compounds having the Formula VIII wherein in step (A) equimolar solutions of Compound V and bromine are quickly and concurrently mixed together with cooling, the solvent of the solutions being selected from the group comprising chloroform, carbon tetrachloride, methylene chloride, dichloroethanol, benzene, xylene or toluene, at a temperature maintained below +25° C. with rapid stirring; in step (B) treating one mole of Compound VI with an excess of a base selected from the group comprising concentrated ammonium hydroxide, pyridine, triethylamine, sodium or potassium hydroxide and the like, in an organic solvent selected from the group comprising chloroform, carbon tetrachloride, dichloroethane and methylene chloride, in a temperature range of 0° C. to 40° C., with vigorous stirring for at least ten minutes; and in step (C) treating a solution of Compound VII in dry ether, tetrahydrofuran or dioxane with a strong acid selected from the group comprising p-toluenesulfonic acid, benzenesulfonic acid or boron trifluoride etherate, in a ratio of about one mole of acid per mole of Compound VII, at a temperature in the range of about —20° C. to about +25° C., with rapid stirring; then treating the mixture in situ with at least a four fold molar excess of lithium aluminum hydride at about reflux temperatures for approximately five hours at produce the compound having Formula VIII.

A more preferred embodiment is the process for the preparation of compounds having the Formula VIII wherein in step (A) one liter of a 1 M solution of Compound V is concurrently mixed with one liter of about a 1 M solution of bromine, the solvent selected from the group comprising chloroform, methylene chloride, carbon tetrachloride or dichloroethane, at a temperature maintained below +25° C., with rapid stirring, in step (B) treating one mole of Compound VI with at least two moles of a base selected from the group comprising concentrated ammonium hydroxide and 5–30% sodium or potassium hydroxide, in an organic solvent selected from the group comprising chloroform, methylene chloride and dichloroethane, at about room temperature, with vigorous stirring for at least ten minutes; and in step (C) treating a solution of Compound VII in dry ether, tetrahydrofuran or dioxane with p-toluenesulfonic acid in a ratio of about 1.0 to 1.2 moles of acid per mole of Compound VII, at a temperature of about 0° C. with rapid stirring for at least 15 minutes; then treating the mixture in situ with about a six fold molar excess of lithium aluminum hydride at about reflux temperature for at least five hours to produce the compound having Formula VIII.

A most preferred embodiment is the process of preparing the compound having the Formula VIII in which $R^2$ is methyl wherein in step (A) one liter of a 1 M chloroform solution of Compound V is concurrently mixed with one liter of a 1 M chloroform solution of bromine at a temperature maintained below +25° C., with rapid stirring; in step (B) treating one mole of Compound VI with at least two moles of concentrated ammonium hydroxide in methylene chloride, at about room temperature, with vigorous stirring for at least ten minutes; and in step (C) treating a solution of Compound VII in dry tetrahydrofuran with p-toluenesulfonic acid in ratio of 1.0 to 1.2 moles of acid per mole of Compound VII, at a temperature of about 0° C. with rapid stirring for at least 15 minutes; then treating the mixture in situ with about a six fold molar excess of lithium aluminum hydride at about reflux temperature for at least five hours to produce the compound having Formula VIII in which $R^2$ is methyl.

A preferred embodiment of the present invention is the compound having the formula (VII)

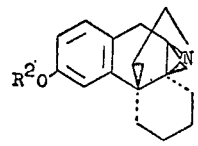

in which $R^2$ is (lower)alkyl; or an acid addition salt thereof.

A most preferred embodiment is the compound having the formula (VIIa)

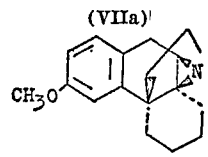

or an acid addition salt thereof.

The essence of the present invention is an improvement of the process described in the invention of my colleagues as described in pending U.S. patent application Ser. No. 229,201, filed Feb. 24, 1972, said improvement resulting in better yields.

PREPARATION OF THE STARTING MATERIALS (XIIIa)

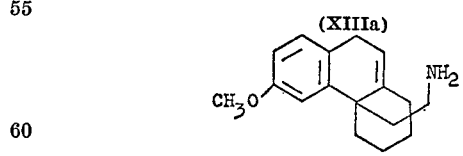

4α-(2-aminoethyl)-1,2,3,4,4a,9-hexahydro-6-methoxyphenanthrene

Step A:

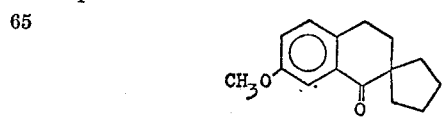

3,4-dihydro-7-methoxy-2,2-tetramethylene-1-(2H) naphthalenone (IIa)

A nitrogen atmosphere was maintained throughout the following reaction. To a stirred suspension of 12 g. (0.5 mole) of sodium hydride in 100 ml. of dry benzene was added during 30 minutes, 16.6 g. (0.2 mole) of anhydrous t-amyl alcohol. The reaction mixture was stirred and refluxed during 15 minutes, and then a solution of 35.2 g. (0.2 mole) of 7-methoxy-3,4-dihydro-1(2H)-naphthalenone (Ia) in 100 ml. of dry benzene was added dropwise. After another 15 minutes, 54.0 g. (0.25 mole) of 1,4-dibromobutane were added over a period of 15 minutes followed by 100 ml. of dry benzene. The resulting reaction mixture was stirred and refluxed during 50 hours. It was then cooled, washed twice with water, dried over anhydrous sodium sulfate and concentrated at reduced pressure. The residual yellow oil was dissolved in 400 ml. of petroleum ether (B.P. 30–60° C.), treated with charcoal, filtered and the solvent evaporated. The resulting clear light yellow oil (45.7 g.) was distilled at reduced pressure and the fraction boiling at 120–123° C./0.05 mm. was collected. This procedure yielded 29.4 g. (65%) of colorless spiroketone IIa. The infrared (IR) and nuclear magnetic resonance (NMR) spectra were consistent with the structure.

Analysis.—Calc'd. for $C_{15}H_{18}O_2$ (percent): C, 78.22; H, 7.88. Found (percent): C, 77.96; H, 7.93.

Step B:

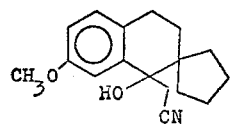

1-hydroxy-7-methoxy-1,2,3,4-tetrahydro-2,2-tetramethylene-1-naphthaleneacetonitrile (IIIa)

To a stirred solution of 13.8 ml. (0.022 mole) of 1.6 M n-butyl lithium in hexane at −80° C. under nitrogen was rapidly added 13.8 ml. of anhydrous tetrahydrofuran (THF) followed immediately by a solution of 0.82 g. (0.02 mole) of acetonitrile in 20 ml. THF which was added during 7 minutes. After stirring for 1 hour at −80° C., the resulting white suspension was treated during 5 minutes with a solution of 4.60 g. (0.02 mole) of the spiroketone IIa in 20 ml. THF. The cold bath was removed and the solution was stirred for 10 minutes before it was poured into ice-water acidified with hydrochloric acid. The layers were separated, and the aqueous layer was extracted with three 25 ml. portions of benzene. After drying over anhydrous sodium sulfate, evaporation of the solvent and recrystallization of the remaining solid from chloroform, there was obtained 4.4 g. (80%) of white solid IIIa, M.P. 140–142° C. The IR and NMR spectra were consistent with the structure.

Analysis.—Calc'd. for $C_{17}H_{21}NO_2$ (percent): C, 75.24; H, 7.80; N, 5.16. Found (percent): C, 75.12; H, 7.91; N, 4.89.

Step C:

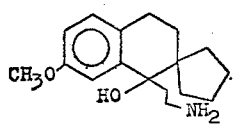

1-(2-aminoethyl)-7-methoxy-1,2,3,4-tetrahydro-2,2-tetramethylene-1-naphthol (IVa)

To a stirred suspension of 0.57 g. (0.015 mole) of lithium aluminum hydride in 20 ml. anhydrous tetrahydrofuran (THF) under $N_2$ was added a solution of 2.71 g. (0.01 mole) of IIIa in 20 ml. tetrahydrofuran. The reaction mixture was stirred for 4 hours at room temperature (r.t.). It was then cooled and treated with 0.6 ml. of water. The inorganic material was filtered off and washed well with ether. The filtrate was extracted with two portions of 15 ml. of 1 N hydrochloric acid. The extract was basified with aqueous ammonia, and the free base was taken up in ether. After drying over anhydrous sodium sulfate and evaporation of the solvent, there was obtained 2.2 g. of slightly yellow oil IVa. It was converted to the oxalate salt in acetone and recrystallized from methanol. This procedure yielded 2.9 g. (76%) of white solid, containing 1 mole of methanol of crystallization; M.P. 178–180° C.

In another experiment IVa was obtained from IIa without isolation of IIIa as follows:

4.6 g. (0.02 mole) of the spiroketone IIa in 20 ml. of tetrahydrofuran was converted to the nitrile IIIa according to the procedure described on the preceding page. To the resulting cold solution (−80° C.) of IIIa, was added 1.14 g. (0.03 mole) of lithium aluminum hydride in small portions. After the addition had been completed, the reaction mixture was stirred at r.t. for 4 hours. After work-up as above, there was obtained 5.7 g. (75% overall) of the oxalate salt of IVa, M.P. 179–170° C. In both procedures, the IR and NMR spectra were consistent with the desired product.

Analysis. — Calc'd. for $C_{17}H_{25}NO_2 \cdot C_2H_2O_4 \cdot CH_3OH$ (percent): C, 63.31; H, 7.70; N, 3.69. Found (percent): C, 63.41; H, 7.43; N, 3.79.

Step D:

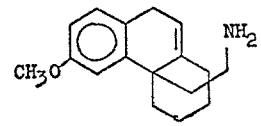

4α-(2-aminoethyl)-1,2,3,4,4a,9-hedahydro-6-methoxyphenanthrene (Va)

Method A: Compound IVa [1.50 g. (0.00548)] (free base liberated from 2 g. of oxalate salt) in 5 ml. of ether was treated with 1.5 ml. of concentrated HCl under $N_2$ at 55–60° C. for 5 hours. To the cooled mixture were added in succession 10 ml. of ether and 10 ml. of water. After shaking, the two layers were separated. The acidic layer was made alkaline with aqueous ammonia and extracted with ether. The ether layer was dried ($K_2CO_3$) and concentrated to yield 1.30 g. of pale yellow oil Va. It was converted to an oxalate salt in acetone. The crystals were filtered and washed with a small amount of methylene chloride. The IR and NMR spectra were consistent with the structure.

Yield 1.7 g. (96%) of white solid, M.P. 187–213° C.

Analysis.—Calc'd. for $C_{17}H_{23}NO \cdot C_2H_2O_4$ (percent): C, 65.69; H, 7.25; N, 4.03. Found (percent): C, 65.46; H, 7.20; N, 3.85.

Method B: 120 g. of the oxalate salt of IVa was slurried in 700 ml. of water, and to it was added 400 ml. of benzene and 60 ml. of concentrated ammonia. The mixture was stirred until all the solid had disappeared (ca. 15 minutes) and then the layers were separated. The water layer was extracted with another 100 ml. of benzene, and the combined benzene layers were shaken with 200 ml. of saturated NaCl solution, filtered over $K_2CO_3$ and concentrated in vacuo. The residual oil (ca. 90 g.) was dissolved in 300 ml. of ether in a one l. round bottom flask and while cooling with an ice-water bath and swirling, to it was added carefully 90 ml. of concentrated HCl and then gently refluxed on the steam bath for three hours in a closed system using an oil bubbler. Then the layers were separated, and to the water layer was added 150 ml. of water. After cooling, the solid was filtered off and washed with 50 ml. of acetonitrile to yield 80–85 g. of the HCl salt. From the mother liquor a further crop of the product can be obtained by liberating the free base and repeating HCl treatment as above. The product was recrystallized as the hydrochloride from methanol-ether; M.P. 135° C. (dec.).

Analysis.—Cal'd for $C_{17}H_{23}NO \cdot HCl \cdot CH_3OH$ (percent): C, 66.34; H, 8.66; N, 4.29. Found (percent): C, 66.34; H, 8.02; N, 4.46.

DESCRIPTION OF THE PREFERRED EMBODIMENTS

Example 1

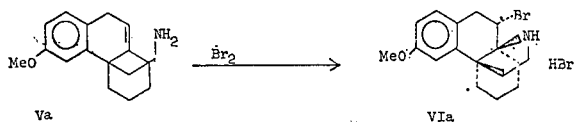

A solution of 4α-(2-aminoethyl)-1,2,3,4,4a,9-hexahydro-6-methoxyphenanthrene (Va) (25.7 g., 0.1 mole) and 100 ml. of reagent grade chloroform was added all at once to 1000 ml. of an 0.1 N bromine in chloroform solution [1] contained in a one-necked two liter round bottom flask equipped with a magnetic stirrer and pre-cooled in an ice-salt bath at 0°. The reaction is exo-thermic.

After stirring for five minutes, the reaction mixture was concentrated on a rotary evaporator at 35–40° in vacuo until approximately 90% of the chloroform had been removed. The resultant solid was filtered off [2] and washed with a cold (0–5°) solution of chloroform/ether (1:1) and then with ether (USP).

After preliminary drying with suction, the final traces of solvents were removed by drying at 100° for one hour. This provided 29.73 g. (72%) of VIa as an off-white solid, M. 205–206° dec.

An analytical sample was recrystallized from glacial acetic acid, M. 207–208.5° dec. The infrared (IR) and nuclear magnetic resonance (NMR) spectra were consistent with the structure.

*Analysis.*—Cal'd for $C_{17}H_{22}BrNO \cdot HBr$ (percent): C, 48.94; H, 5.56; N, 3.36; Br, 38.31. Found (percent): C, 48.66; H, 5.43; N, 3.19; Br, 38.29.

Example 2

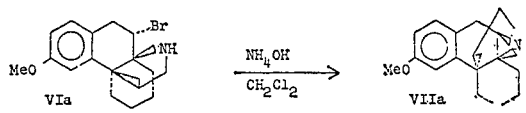

A mixture of 3-methoxy-9α-bromonorhasubanan hydrobromide (2.0 g., 4.78 mm.), methylene chloride (40 ml.), and 10 ml. of concentrated ammonium hydroxide solution was placed in an erlenmeyer flask and magnetically stirred vigorously for 20–30 minutes.

The two phase system was then transferred to a separatory funnel and the methylene chloride layer separated, washed once with water, dried ($Na_2SO_4$), and evaporated to dryness in vacuo. This left 1.12 g. (92%) of a light brown oil whose TLC showed only one spot and whose NMR spectrum was consistent with structure VIIa. This oil was used as such in other experiments.

The product VIIa was analyzed as the hydrobromide salt.

*Analysis.*—Calc'd for $C_{17}H_{21}NO \cdot HBr$ (percent): C, 60.72; H, 6.59; N, 4.17. Found (percent): C, 61.07; H, 6.64; N, 3.94.

Example 3

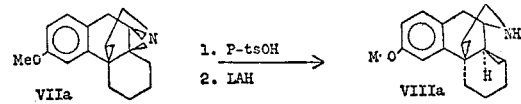

Anhydrous p-toluenesulfonic acid (4.13 g., 24 mm.) was added to a solution of aziridine compound [(VIIa), (5.80 g., 22.8 mm.)] and 100 ml. of anhydrous tetrahydrofuran and the mixture stirred at 25° (room temperature) until the acid had dissolved.

---
[1] The concentration of the bromine/chloroform solution should not be increased.
[2] If the solid is not filtered off immediately, it becomes sticky and more difficult to purify. If there is difficulty in crystallizing the product, small amounts of dry ether can be added and crystallization induced by cooling and scratching. In such cases the product mixture should be cooled (0°) at least 30 minutes before filtering to insure complete precipitation.

---

Lithium aluminum hydride (5.0 g., 132 mmoles [mm.]) was added in portions as quickly as the vigorous reaction would allow and then the reaction was refluxed for 18 hours. The usual workup afforded 4.86 g. of a light yellow oil. Thin layer chromatography (TLC) examination showed two spots; the desired VIIIa and another slightly less polar compound.

The oil was dissolved in a small volume (ca. 20 ml.) of dry acetone and concentrated HCl was added dropwise until the solution was acidic. A white precipitate formed upon cooling and scratching the solution. The precipitate was filtered off, washed with dry acetone, and dried in an oven at 100°. This afforded 3.82 g. of a white solid, m. 257–61° dec. another 0.12 g. of white solid was recovered by cooling (0°) the combined mother liquor and acetone washings overnight. Total yield was 59%.

TLC examination of the above solid m. 257–61° dec. showed it to contain a small amount (<10%) of the aforementioned less polar byproduct. Recrystallization of this solid from 2-propanol-methanol (95:5) raised the M.P. to 283.5–5° dec. This material was sufficiently pure for most synthetic purposes and compared favorably with authentic compound VIIIa prepared by the method described in U.S. Ser. No. 229,201; M.P. 293–295° C. (with decomposition).

Example 3A

Preparation of Compound VIIIa using boron trifluoride etherate.—A solution of $BF_3 \cdot Et_2O$ (0.54 ml.: 4.24 mm.) and 2 ml. of dry ether was slowly added to a vigorously stirring solution of aziridine compound [(VIIa) (1.08 g.; 4.24 mm.)] and ca. 25 ml. of dry ether at 0°. The resultant suspension of white solid was allowed to reach 25° and then lithium aluminum hydride (1.0 g.; 26.4 mm.) was added as fast as possible. The reaction mixture was refluxed 18 hours and then worked up in the usual way. This afforded 0.79 g. of a light yellow oil. TLC examination of this oil showed that it contained two major spots; the desired isomorphinan (VIIIa) and another much less polar compound.

The oil was dissolved in a small volume of dry acetone and concentrated HCl added dropwise until the solution was acidic. This afforded 0.43 g. of white solid, m. 288–9° dec. (40%).

An analytical sample was recrystallized from ethanol/ether, m. 290–1° dec. The IR and NMR spectra were consistent with the assigned structure.

*Analysis.*—Calc'd for $C_{17}H_{23}NO \cdot HCl$ (percent): C, 69.49; H, 8.28; N, 4.77. Found (percent): C, 69.68; H, 8.33; N, 4.62.

Example 4

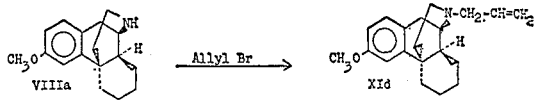

To a stirred solution of 900 mg. of the amine VIIIa and 1.7 g. of triethylamine in absolute ethanol (12 ml.) is added 0.605 g. of allyl bromide. The mixture is refluxed for 18 hours and evaporated to dryness. The residue is mixed with 20% aqueous sodium carbonate solution and the mixture extracted with several portions of ether. The ether extracts were washed with water, dried over $Na_2SO_4$ and evaporated to yield the product XId as a light yellow oil.

*Analysis.*—Calc'd for $C_{20}H_{27}NO$ (percent): C, 80.76; N, 9.15; N, 4.71. Found (percent): C, 80.95; H, 9.18; N, 4.95.

Example 5

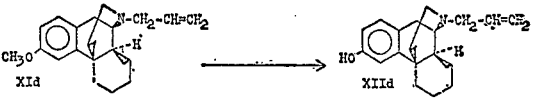

A solution of XId (13 mmole) in 130 ml. of dry $CH_2Cl_2$ is added dropwise during 30 minutes to a cooled (ice-salt bath) and stirred solution of 27 mmole of BBr$_3$ in 10 ml. dry CH$_2$Cl$_2$. After addition, it is stirred at room temperature for 30 minutes. The reaction mixture is decomposed with water, basified with NH$_4$OH and the layers separated. The basic layer is extracted with CH$_2$Cl$_2$ and the combined CH$_2$Cl$_2$ solution is dried and evaporated to dryness to give XIId. This is converted to its HCl salt in acetone with 3 ml. concentrated HCl acid. The salt recrystallized twice from 90% ethanol to give the title product as the hydrochloride salt.

Example 6

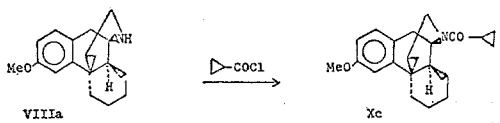

A soluiton of cyclopropanecarboxylic acid chloride (2.4 g.; 20 mm.) and 10 ml. of dry CH$_2$Cl$_2$ was added slowly to a stirred solution of 3-methoxy-isomorphinan hydrochloride VIIIa (4.0 g.; 13.6 mm.), triethylamine (15 ml.; excess ) and 60 ml. of dry CH$_2$Cl$_2$ at 0°. After the addition was complete, the reaction mixture was stirred at 25° for one hour. The reaction mixture was worked up by washing successively with water, 1 N NaOH, 1 N, HCl, and water. After drying (Na$_2$SO$_4$) the reaction mixture was evaporated to dryness. This left 5.03 g. (110%) of a pale brown oil. TLC showed only one compound identified as the title Compound Xc which was used as such in Example 7.

Example 7

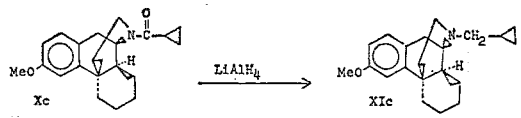

To a refluxing suspension of 2 g. of lithium aluminum hydride in 50 ml. of dry ether was slowly added 5.03 g. (15.5 mm.) of crude amine Xc from Example 6 dissolved in 50 ml. of dry ether. After refluxing for one hour, the reaction mixture was allowed to stand at 25° for 18 hours and then it was worked up in the usual way. This provided 3.5 g. of basic material whose IR and NMR spectra were in accord with the desired structure XIc.

Example 8

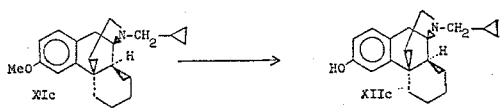

Substitution in the procedure of Example 5 for the Compound XId used therein of an equimolar quantity of Compound XIc produced the desired Compound XIIc; M.P. (as the HCl·H$_2$O) 269-270° C.

Analysis.—Calcd. for C$_{20}$H$_{27}$NO·HCl·H$_2$O (percent): C, 68.26; H, 8.56; N, 3.98. Found (percent): C, 67.91; H, 8.03; N, 4.32.

Example 9

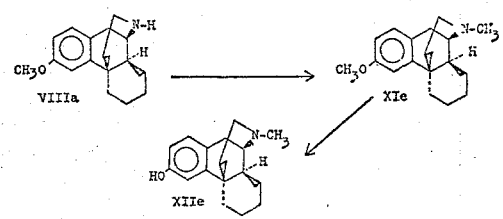

(A) Substitution in the procedure of Example 4 for the allyl bromide used therein of an equimolar quantity of methyl bromide produces the product XIe.

(B) Substitution in the procedure of Example 5 for the XId used therein of an equimolar quantity of XIe produces the product XIIe.

Example 10

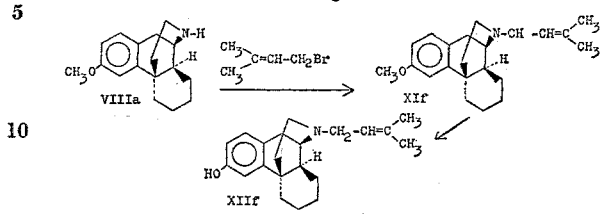

(A) Substitution in the procedure of Example 4 for the allyl bromide used therein of an equimolar quantity of 3,3-dimethylallyl bromide produced the product XIf.

(B) Substitution in the procedure of Example 5 for the XId used therein of an equimolar quantity of XIf produced the product XIIf; M.P. (as the HCl) 267–269° C.

Analysis.—Calc'd for C$_{21}$H$_{29}$NO·HCl (percent): C, 72.49; H, 8.69; N, 4.02. Found (percent): C, 72.32; H, 8.80; N, 3.97.

Example 11

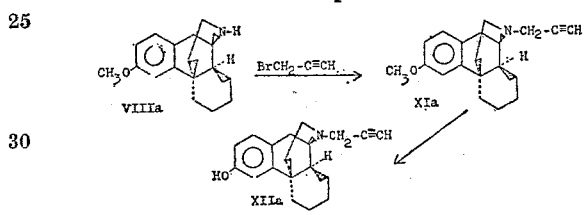

(A) Substitution in the procedure of Example 4 for the allyl bromide used therein of an equimolar quantity of propargyl bromide produced Compound XIa.

(B) Substitution in the procedure of Example 5 for the XId used therein of an equimolar quantity of XIa produced the product XIIa; M.P. (as the HCl·C$_2$H$_5$OH) 252—253° C.

Analysis.—Calc'd for C$_{19}$H$_{23}$NO·HCl·C$_3$OH (percent): C, 69.30; H, 8.30; N, 3.84. Found (percent): C, 69.32; H, 8.42; N, 3.82.

Example 12

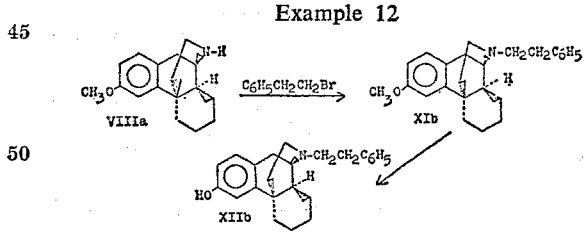

(A) Substitution in the procedure of Example 4 for the allyl bromide used therein of an equimolar quantity of phenethylbromide produced Compound XIb; M.P. (as the HCl·O·3H$_2$O) 190–191° C.

Analysis.—Calc'd for C$_{25}$H$_{31}$NO·HCl·O·3H$_2$O (percent): C, 74.33; H, 8.15; N, 3.47. Found (percent): C, 74.33; H, 7.94; N, 3.46.

(B) Substitution in the procedure of Example 5 for the Compound XId used therein of an equimolar quantity of Compound XIb produces the product XIIb.

Example 13

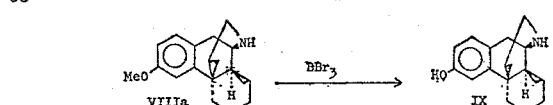

A solution of BBr$_3$ (mm.) in CH$_2$Cl$_2$ was slowly added to a 0° solution of 3-methoxy-isomorphinan (VIIIa) (0.77 g.; 3 mm.) in 40 ml. of CH$_2$Cl$_2$ under nitrogen. The reaction mixture was then stirred at 0° until TLC examination showed that VIIIa had completely reacted (1.5 hour). The reaction was worked up by adding 5 ml. of H₂O (carefully!) and then 15 ml. of NH₄OH. Separation of the CH₂Cl₂ phase, washing, drying (Na₂SO₄), and in vacuo evaporation yielded 0.78 g. of an off-white colored foam.

The hydrochloride derivative was prepared by dissolving this foam in absolute EtOH and adding ethereal HCl until the solution was acidic. Careful dilution with ether and cooling overnight afforded 400 mg. (48%) of off-white solid; M.P. 318–322° dec. An analytical sample was recrystallized from MeOH/Et₂O, M.P. 319–322° dec. The IR and NMR spectra were consistent with assigned structure IX.

*Analysis.*—Calc'd for $C_{16}H_{21}NO \cdot HCl$ (percent): C, 68.68; H, 7.92; N, 5.01. Found (percent): C, 68.44; H, 8.02; N, 4.88.

Example 14

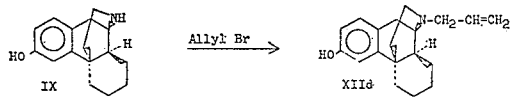

Substitution in the procedure of Example 4 for the Compound VIIIa used therein of an equimolar quantity of Compound IX produced Compound XIId; M.P. (as HCl·O·5H₂O) 228.5–231° C.

*Analysis.*—Calc'd for $C_{19}H_{25}NO \cdot HCl \cdot O \cdot 5H_2O$ (percent): C, 69.41; H, 8.28; N, 4.26. Found (percent): C, 69.88; H, 8.23; N, 4.07.

Example 15

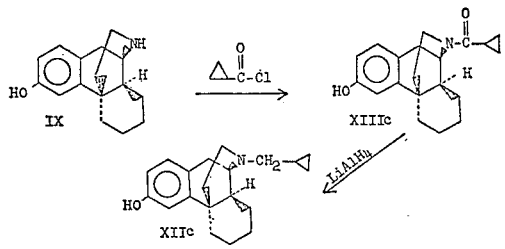

(A) Substitution in the procedure of Example 6 for the VIIIa used therein of an equimolar quantity of IX produced the product XIIIc.

(B) Substitution in the procedure of Example 7 for the Xa used therein of an equimolar quantity of XIIIc produced the product XIIc; M.P. (as HCl·H₂O) 269–270° C.

*Analysis.*—Calc'd for $C_{20}H_{27}NO \cdot HCl \cdot H_2O$ (percent): C, 68.26; H, 8.56; N, 3.98. Found (percent): C, 67.91; H, 8.03; N, 4.32.

Example 16

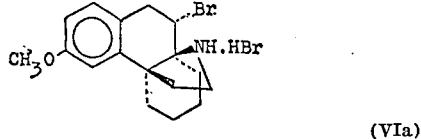

3 - methoxy - 9α - bromorhasubanan hydrobromide[1] (VIa).—A solution of 4α-(2-aminoethyl)-12,3,4,4a,9-hexahydro-6-methoxyphenanthrene (Va) (25.7 g., 0.1 mole) and 100 ml. of reagent grade chloroform was added all at once to 1000 ml. of an 0.1 N bromine in chloroform solution[2] contained in a one-necked 2 liter round bottom flask equipped with a magnetic stirrer and precooled in an ice-salt bath to 0°.

After stirring for five minutes, the reaction mixture was concentrated on a rotary evaporator at 35–40° in vacuo until approximately 90% of the chloroform had been removed. The resultant solid was filtered off[3] and washed with a cold (0–5°) solution of chloroform/ether (1:1) and then with ether (USP).

After preliminary drying with suction, the final traces of solvents were removed by drying at 100° for one hour. This provided 29.73 g. (72%) of VI as an off-white solid, m. 205–206° dec.

An analytical sample was recrystallized from glacial acetic acid, m. 207–208.5° dec. The IR and NMR spectra were consistent with the structure.

*Analysis.*—Calc'd for $C_{17}H_{22}BrNO \cdot HBr$ (percent): C, 48.94; H, 5.56; N, 3.36; Br, 38.31. Found (percent): C, 48.66; H, 5.43; N, 3.19; Br, 38.29.

Example 17

Concurrent addition procedure for the preparation of VIa.—A solution of Va (5 ml. of 1.29 M; 5.45 mm.) in CHCl₃ and a solution of Br₂ (5 ml. of 1.29 M; 5.45 mm) in CHCl₃ were simultaneously introduced by hypodermic syringes (as rapidly as possible) to a flask equipped with magnetic stirring, a nitrogen atmosphere (not essential) and an external ice-salt bath (0 to −10° C.). No HBr evolution was detected.

A 0.5 ml. aliquot of this reaction mixture was removed and diluted with 0.5 ml. of acetoine. This produced an immediate precipitate. This suspension was warmed at 40° for one hour, then filtered through a medium porosity sintered glass funnel. The precipitate was washed with acetone and then ether and dried at 100° for 20 minutes. This gave 59.4 mg. (minimum yield of 50.5±1.5%) of VIa. The IR spectrum and M.P. were identical to the material obtained using the original method.

I claim:

1. A process for the preparation of compounds having the formula

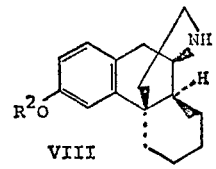

in which R² is (lower)alkyl of 1 to 10 carbon atoms, which process comprises the consecutive steps of (A) brominating the compound having the formula

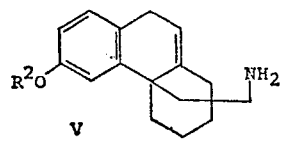

in which R² is (lower)alkyl of 1 to 10 carbon atoms with liquid bromine in chloroform, carbon tetrachloride, dichloroethane, benzene, toluene, xylene or methylene chloride in a ratio of at least 1 mole of bromine per mole of Compound V, at about −15° C. to +15° C., with stirring to produce the compound, which is isolated, having the formula in which R² is as above:

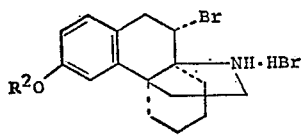

(B) mixing Compound VI with a base selected from the group consisting of concentrated ammonium hydroxide, pyridine, triethylamine, sodium hydroxide and potassium hydroxide, in an organic solvent selected from the group consisting of methylene chloride, chloroform, carbon tetrachloride, dichloroethane, benzene, toluene and xylene at a temperature in

---

[1] Nomenclature is based on that used by M. Tomita et al., Chem Pharm. Bull. (Tokyo), 13, 538 (1965).
[2] The concentration of the bromine/chloroform solution cannot be increased without a decrease in yield.
[3] If the solid is not filtered off immediately, it becomes sticky and more difficult to purify.

the range of about −10° C. to about +40° C. to produce the compound, which is isolated, having the formula

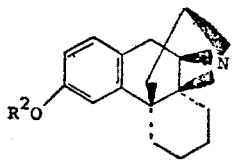

(VII)

in which R² is as above; and (C) mixnig a solution of Compound VII in dry ether, tetrahydrofuran or dioxane with at least an equimolar quantity of an anhydrous strong acid selected from the group consisting of p-toluensulfonic acid, benzenesulfonic acid or boron trmifluoride etherate in the temperature range of about −10° C. to about +15° C.; then mixing the mixture in situ with an excess of lithium aluminum hydride with the aid of heat for at least five hours to produce the product having the Formula VIII.

2. A process of claim 1 wherein in step (A) a solution of 1 mole of Compound V is added rapidly to about 1.0 to 1.3 moles of bromine, at a maximum molarity of 0.1 M bromine dissolved in chloroform, carbon tetrachloride, methylene chloride, dichloroethane, benzene, xylene or toluene, at a temperature of about −15° C. to +15° C.; in step (B) mixing one mole of Compound VI with an excess of a base selected from the group consisting of concentrated ammonium hydroxide, pyridine, triethylamine and sodium or potassium hydroxide, in an organic solvent selected from the group consisting of chloroform, carbon tetrachloride, dichloroethane and methylene chloride, in a temperature range of 0° C. to 40° C., with vigorous stirring for at least ten minutes; and in step (C) mixing a solution of Compound VII in dry ether, tetrahydrofuran or dioxane with a strong acid selected from the group consisting of p-toluenesulfonic acid, benzenesulfonic acid or boron trifluoride etherate, in a ratio of about 1 mole of acid per mole of Compound VII, at a temperature in the range of about −20° C. to about +25° C. with rapid stirring; then mixing the mixture in situ with at least a four fold molar excess of lithium aluminum hydride at about reflux temperatures for at least five hours to produce the compound having the Formula VIII.

3. A process of claim 1 wherein in step (A) 1 mole of Compound V is added rapidly to an equimolar amount of bromine, at a maximum molarity of 0.1 M bromine dissolved in chloroform, methylene chloride, carbon tetrachloride or dichloroethane, at a temperature of about −15° C. to about 0° C. with rapid stirring; in step (B) mixing one mole of Compound VI with at least two moles of a base selected from the group consisting of concentrated ammonium hydroxide and 5–30% sodium or potassium hydroxide, in an organic solvent selected from the group consisting of chloroform, methylene chloride and dichloroethane, at about room temperature, with vigorous stirring for at least ten minutes; and in step (C) mixing a solution of Compound VII in dry ether, tetrahydrofuran or dioxane with p-toluenesulfonic acid in a ratio of about 1.0 to 1.2 moles of acid per mole of Compound VII, at a temperature of about 0° C. with rapid stirring for at least 15 minutes; then mixing the mixture in situ with about a six fold molar excess of lithium aluminum hydride at about reflux temperature for at least five hours to produce the compound having Formula VIII.

4. The process of claim 1 for the preparation of Compound VIII wherein in step (A), in which R² is methyl, 1 mole of Compound V is added rapidly to ten liters of 0.1 M bromine in chloroform at a temperature of −15° C. to 0° C. with rapid stirring; in step (B) mixing one mole of Compound VI with at least two moles of concentrated ammonium hydroxide in methylene chloride, at about room temperature, with vigorous stirring for at least ten minutes; and in step (C) mixing a solution of Compound VII in dry tetrahydrofuran with p-toluenesulfonic acid in a ratio of 1.0 to 1.2 moles of acid per mole of Compound VII, at a temperature of about 0° C. with rapid stirring for at least 15 minutes; then mixing the mixture in situ with about a six fold molar excess of lithium aluminum hydride in about reflux temperature for at least five hours to produce the compound having Formula VIII in which R² is methyl.

5. The process of claim 1 wherein step (A) equimolar solutions of Compound V and bromine are concurrently mixed together with cooling, the solvent of the solutions being selected from the group consisting of chloroform, carbon tetrachloride, methylene chloride, dichloroethanol, benzene, xylene and toluene, at a temperature maintained below +25° C., with rapid stirring; in step (B) mixing one mole of Compound VI with an excess of a base selected from the group consisting of concentrated ammonium hydroxide, pyridine, triethylamine, and sodium or potassium hydroxide, in an organic solvent selected from the group consisting of chloroform, carbon tetrachloride, dichloroethane and methylene chloride, in a temperature range of 0° C. to 40° C., with vigorous stirring for at least ten minutes; and in step (C) mixing a solution of Compound VII in dry ether, tetrahydrofuran or dioxane with a strong acid selected from the group consisting of p-toluenesulfonic acid, benzenesulfonic acid and boron trifluoride etherate, in a ratio of about 1 mole of acid per mole of Compound VII at a temperature in the range of about −20° C. to about +25° C., with rapid stirring; then mixing the mixture in situ with at least a four fold molar excess of lithium aluminum hydride at about reflux temperature for at least five hours to produce the compound having Formula VIII.

6. The process of claim 1 wherein step (A) one liter of a 1 M solution of Compound V in concurrently mixed with one liter of about a 1 M solution of bromine, the solvent selected from the group consisting of chloroform, methylene chloride, carbon tetrachloride and dichloroethane, at a temperature maintained below +25° C., with rapid stirring; in step (B) mixing 1 mole of Compound VI with at least 2 moles of a base selected from the group consisting of concentrated ammonium hydroxide and 5–30% sodium or potassium hydroxide, in an organic solvent selected from the group consisting of chloroform, methylene chloride and dichloroethane, at about room temperature with vigorous stirring for at least ten minutes; and in step (C) mixing a solution of Compound VII in dry ether, tetrahydrofuran or dioxane with p-toluene-sulfonic acid in a ratio of about 1.0 to 1.2 moles of acid per mole of Compound VII, at a temperature of about 0° C. with rapid stirring for at least 15 minutes; then mixing the mixture in situ with about a six fold molar excess of lithium aluminum hydride at about reflux temperature for at least five hours to produce the compound having Formula VIII.

7. The process of claim 1 for the preparation of Compound VIII wherein in step (A), in which R² is methyl, 1 liter of a 1 M chloroform solution of Compound V is concurrently mixed with 1 liter of a 1 M chloroform solution of bromine at a temperature maintained below +25° C., with rapid stirring; in step (B) mixing one mole of Compound VI with at least 2 moles of concentrated ammonium hydroxide in methylene chloride, at about room temperature, with vigorous stirring for at least ten minutes; and in step (C) mixing a solution of Compound VII in dry tetrahydrofuran with p-toluenesulfonic acid in a ratio of 1.0 to 1.2 moles of acid per mole of Compound VII, at a temperature of about 0° C. with rapid stirring for at least 15 minutes; then mixing the mixture in situ with about a six fold molar excess of lithium aluminum hydride at about reflux temperature for at least five hours to produce the compound having the Formula VIII in which $R^2$ is methyl.

8. A compound having the formula

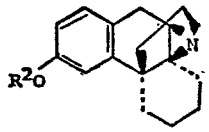

(VII)

in which $R^2$ is (lower)alkyl of 1 to 10 carbon atoms; or a nontoxic acid addition salt thereof.

9. The compound of claim 8 having the formula

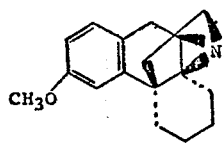

(VII)

or a nontoxic acid addition salt thereof.

References Cited
UNITED STATES PATENTS
3,285,922  11/1966  Gates _____ 260—285

OTHER REFERENCES

Murphy et al.: Jour. Org. Chem., vol. 25, pp. 1386–8 (1960).

DONALD G. DAUS, Primary Examiner

U.S. Cl. X.R.

260—465 F, 570.8 R, 510.8 TC, 694; 424—260